T. M. FOOTE.
WEIGHING MACHINE.
APPLICATION FILED FEB. 21, 1914.

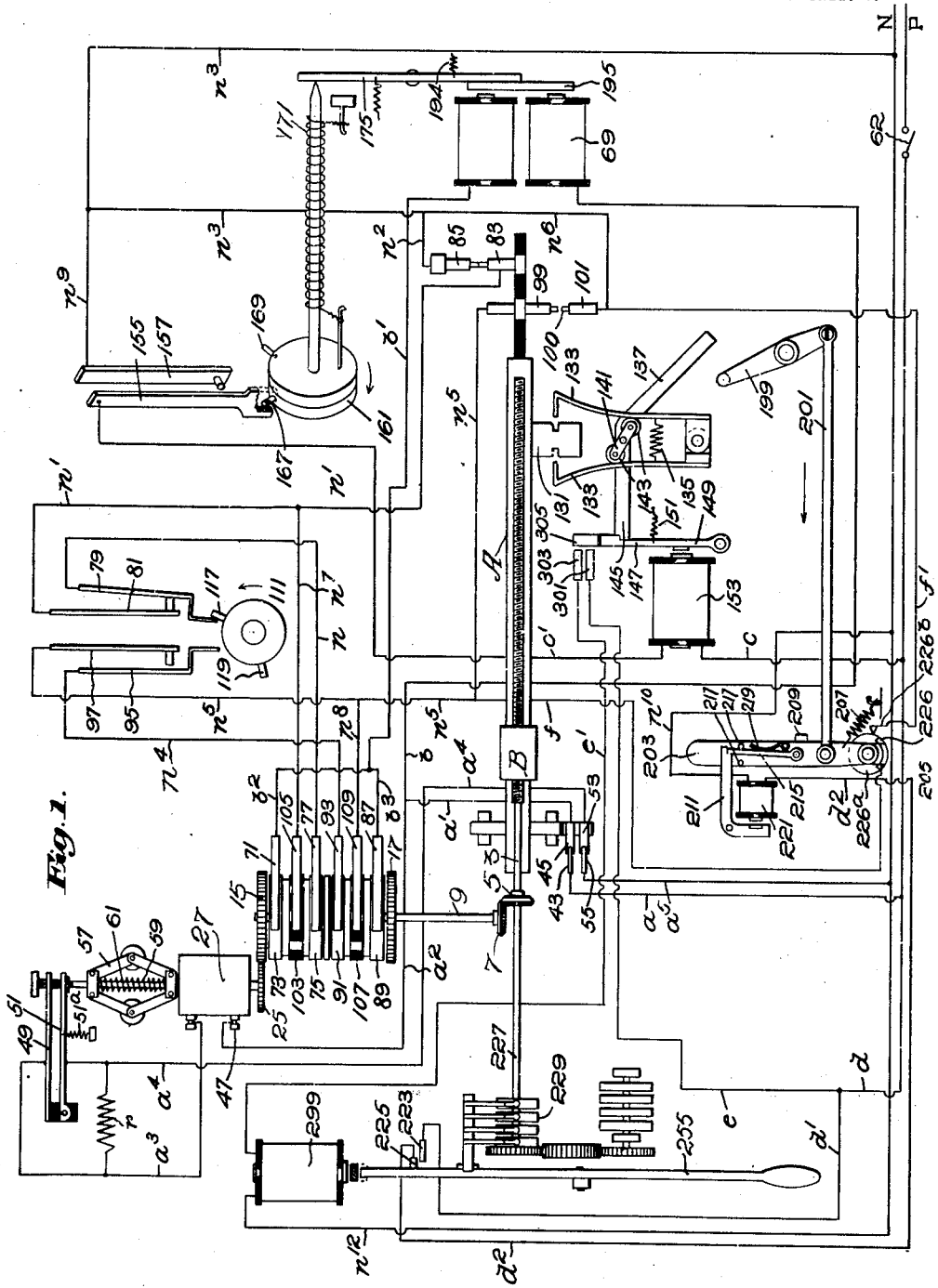

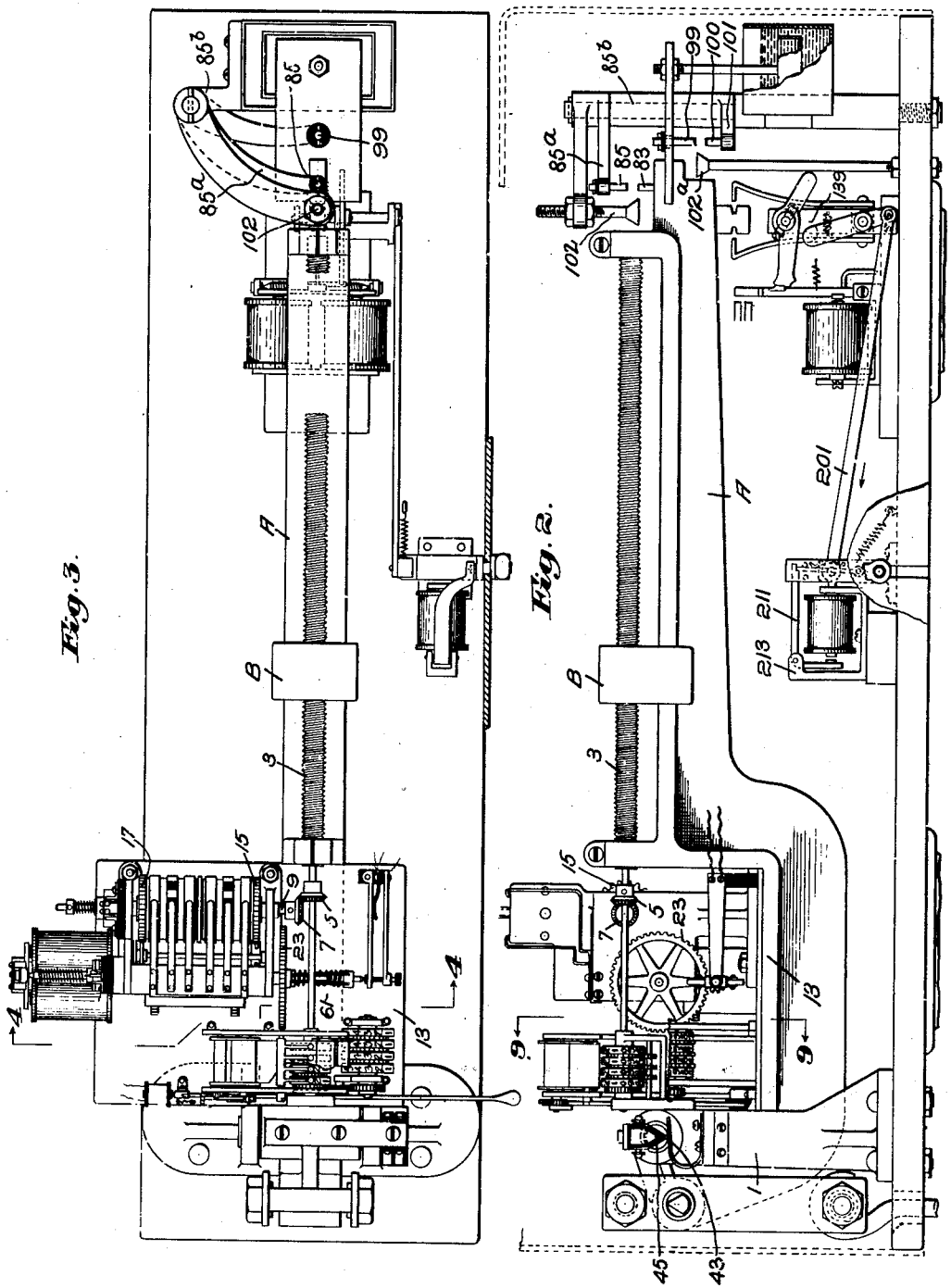

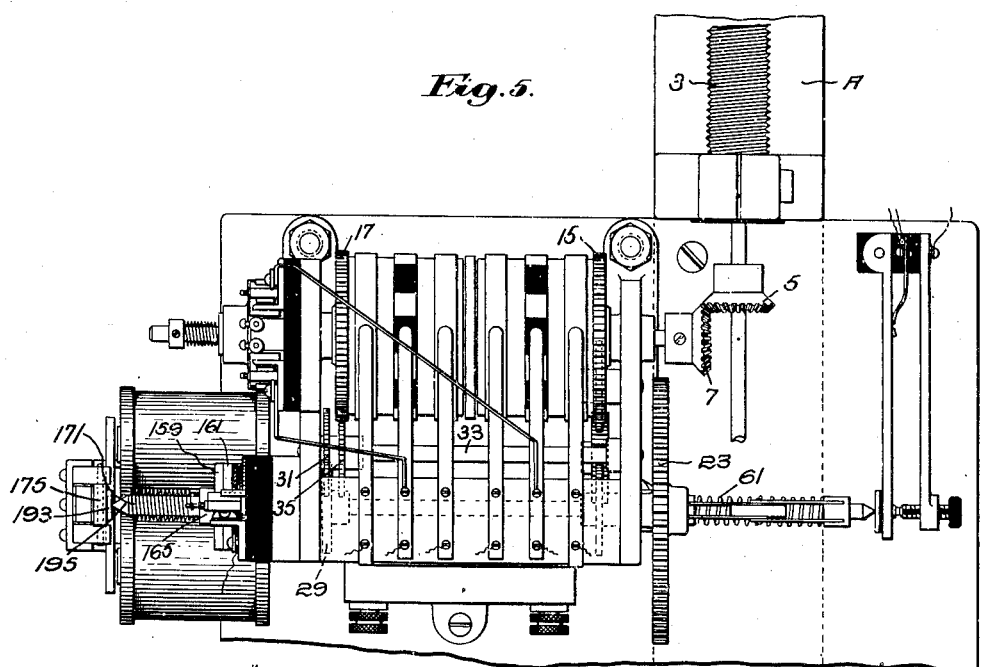
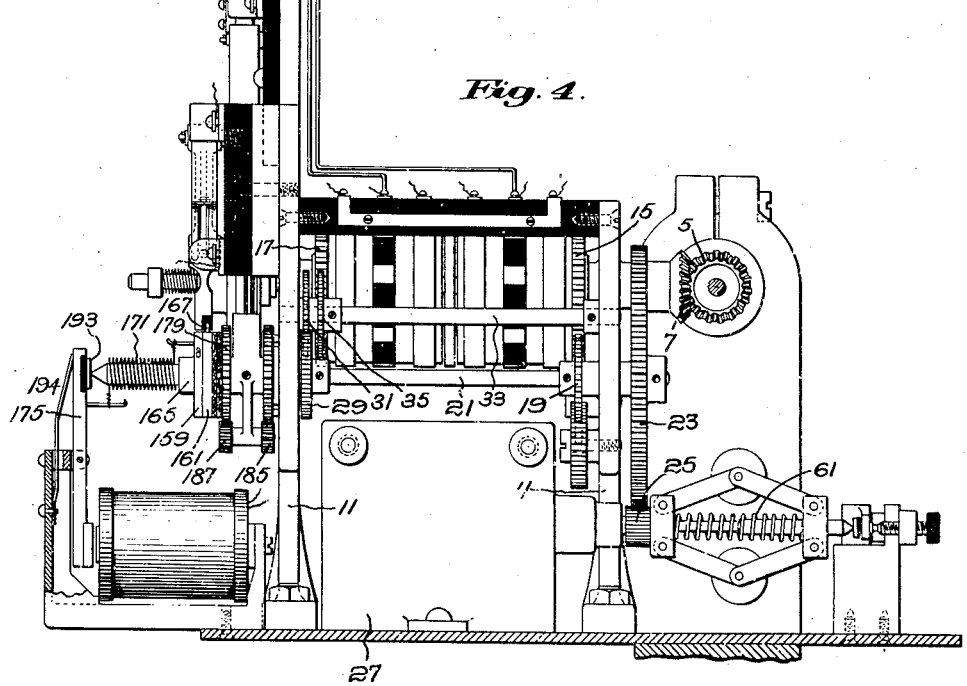

1,344,339.

Patented June 22, 1920.
5 SHEETS—SHEET 4.

Witnesses:

Inventor:
Theodore M. Foote

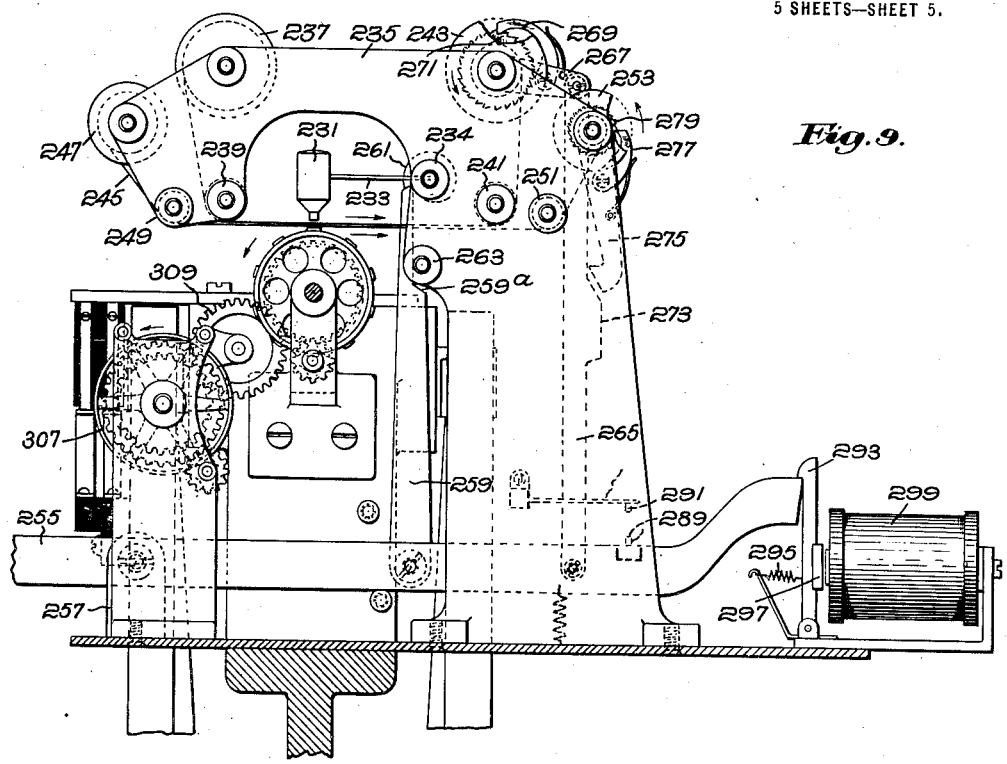

UNITED STATES PATENT OFFICE.

THEODORE M. FOOTE, OF ALLSTON, MASSACHUSETTS, ASSIGNOR, BY MESNE ASSIGNMENTS, TO BOSTON SCALE AND MACHINE CO., OF BOSTON, MASSACHUSETTS, A CORPORATION OF MASSACHUSETTS.

WEIGHING-MACHINE.

1,344,339.      Specification of Letters Patent.      Patented June 22, 1920.

Application filed February 21, 1914. Serial No. 820,332.

*To all whom it may concern:*

Be it known that I, THEODORE M. FOOTE, a citizen of the United States, and resident of Allston, Massachusetts, have invented an Improvement in Weighing-Machines, of which the following description, in connection with the accompanying drawings, is a specification, like characters on the drawings representing like parts.

This invention relates to weighing machines or scales, and among other objects provides a simple and effective clutch mechanism for transmitting a continuous and a step-by-step movement to the poise along the beam.

The character of the invention may be best understood by reference to the following description of an illustrative embodiment thereof shown in the accompanying drawings, wherein:—

Figure 1 is a diagrammatic view showing various instrumentalities comprising an illustrative weighing machine embodying the invention and electrical connections for said instrumentalities;

Fig. 2 is a side elevation of the weighing beam, poise and various instrumentalities coöperating therewith;

Fig. 3 is a plan view of the devices shown in Fig. 2;

Figure 6:
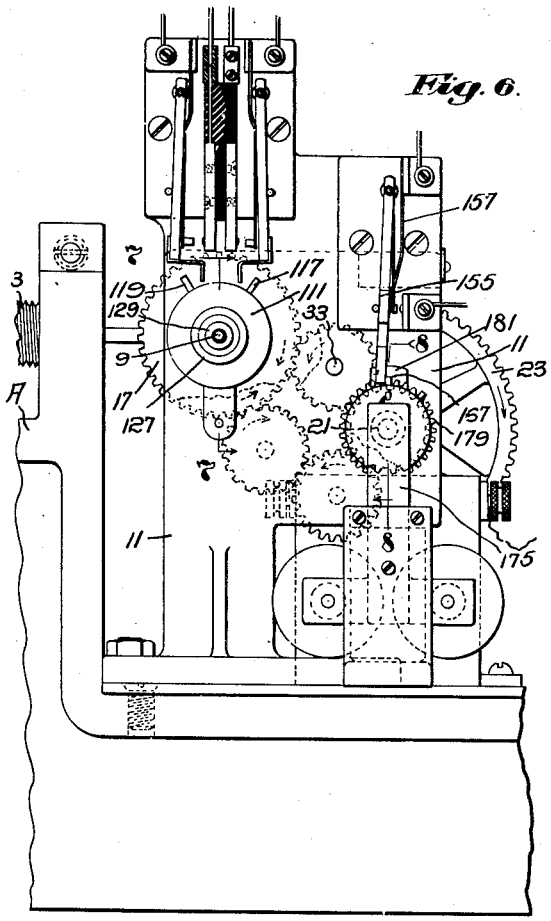
Figure 8:
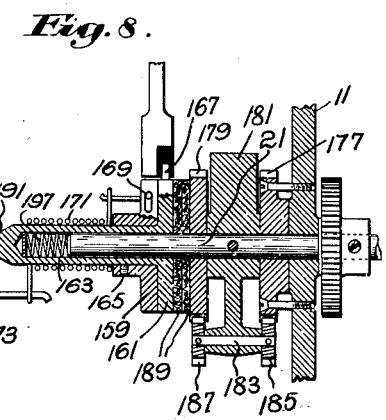
Figure 7:
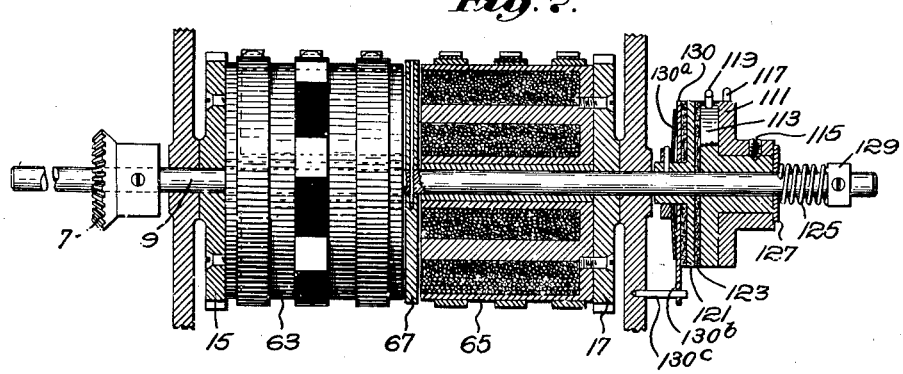

Fig. 4 on an enlarged scale is a section taken on line 4—4 of Fig. 3;

Fig. 5 is a plan view of the devices shown in Fig. 4;

Fig. 6 is an end elevation of the devices shown in Figs. 4 and 5;

Fig. 7 on an enlarged scale is a sectional detail of the clutch shown in Figs. 4 and 5;

Fig. 8 is a sectional detail taken on line 8—8 of Fig. 6 and shown on an enlarged scale; and Fig. 9 on an enlarged scale is a section taken on line 9—9 of Fig. 2 showing an indicator and recorder.

Referring to the drawings, the embodiment of the invention which is there shown for illustrative purposes comprises a weighing beam A (Figs. 1, 2 and 3) fulcrumed on a support 1 and connected by a system of links and levers with the scale platform. Since said links, levers and platform are of usual construction it is unnecessary to show them herein.

A poise B is mounted on the beam A and is fed along the same by a screw shaft 3 journaled in appropriate bearings on said beam.

The screw shaft is rotated by a motor through a clutch mechanism. The connections from said motor to said shaft include a bevel gear 5 on the latter meshing with a bevel gear 7 on a shaft 9 transverse to the shaft 3 and journaled in bearings in standards 11 shown herein as mounted on a plate 13 on the scale beam. Loose on this shaft are gears 15 and 17 adapted to be driven in opposite directions from the motor. The gear 15 is driven by a gear 19 fast on a shaft 21 parallel to the shaft 9 and also journaled in said standards 11. This shaft projects beyond one of said standards and receives a large gear 23 driven by a pinion 25 fast on the shaft of the motor 27. By these connections the gear 15 will be driven continuously in one direction by said motor.

To drive the gear 17 in the opposite direction the shaft 21 referred to, is provided with a gear 29 meshing with a gear 31 fast on a shaft 33 journaled in said standards and having a second gear 35 thereon meshing with the gear 17. Obviously by the interposition of the intermediate gears 31 and 35 in the drive between the gear 29 and the gear 17 the latter will be given a rotation opposite in direction to that of the gear 15.

The circuit for the poise motor 27 comprises a main positive wire P from which is tapped a wire $a$ connected to a resilient contact 43 (Fig. 2) coöperating with a contact 45 on an extension of the beam fulcrum knife. The contact 45 is connected by a wire $a'$ with a wire $a^2$ connected to a binding post 47 connected in turn with the coils of said motor. These coils are connected by a wire $a^3$ with a fixed contact 49 adapted to be connected with a contact 51, the latter being connected by a wire $a^4$ with a contact 53 on the projection of the beam knife fulcrum, referred to. The contact 53 is connected with a spring contact 55 connected by a wire $a^5$ with the main negative wire N.

The motor is driven continuously at a constant rate of speed. To accomplish this it is provided with a governor 57 mounted on an extension of the motor shaft. Also mounted on this shaft is a sleeve 59 telescoping therewith and terminating in a cone bearing point for engagement with the contact 51 in the motor circuit, referred to.

This contact is pivotally mounted and is normally urged away from the other contact 49 by a spring 51ª. Encircling the motor shaft and sleeve 59 is a spring 61 stronger than the spring 51ª and tending to connect said contacts 49 and 51. In the event that the speed of the motor becomes too high the governor balls will fly outward against the resistance of the spring 61 and draw inward the cone point and break the connection between the contacts 49 and 51, thereby reducing the speed of the motor. When the motor slows down sufficiently the governor balls move inward and the spring 61 forces the cone end of the sleeve outward and again connects the contacts 49 and 51, thereby increasing the speed of the motor. Thus the governor will operate to automatically make and break and variably connect the contacts 49 and 51 and maintain a constant speed of the motor.

To prevent objectionable sparking between the governor controlled contacts 49 and 51 a resistance wire $r$ is shunted across the wires $a^3$ and $a^4$ of the motor circuit. This resistance is so proportioned that it will carry just enough current to the motor to barely turn the same if once it has been started. As a result the running current of the motor which is automatically made and broken by the governor is simply the current which is effective to maintain rotation of the motor at the speed desired after once the motor has been started. Consequently the amount of current which is made and broken and the sparking tendency is reduced to a minimum.

To control the starting and stopping of the motor a switch 62 is provided in the main positive line P. This switch will be closed to supply current to the motor and various other circuits to be described.

Electrical clutches are provided for connecting the gears 15 and 17 to the shaft 9. These clutches (Fig. 7) comprise electromagnetic coils 63 and 65 fast to said gears 15 and 17 respectively. Interposed between these coils is a disk clutch member 67 fast on the shaft 9. If the electro-magnetic coils 63 are energized they will grip the disk 67 and impart rotation to the shaft 9 and feed the poise in one direction. If on the other hand, the electro-magnetic clutch 65 is energized it will grip the disk member 67 and rotation will be imparted from the motor to the poise screw shaft in an opposite direction.

The circuits for energizing the clutch magnet coils 63 and 65 will now be described. The circuit for the coil 63 comprises a wire $b$ tapped from the wire $a'$ in the motor circuit and is connected to a magnet 69 for controlling a beam lock timer to be described. This magnet is connected by a wire $b'$ with branch wires $b^2$ and $b^3$.

The branch wire $b^2$ is connected to a brush contact 71 coöperating with a contact ring 73 encircling and connected to the clutch magnet coils 65. A second contact ring 75 is provided also encircling and connected to the coils of the clutch magnet 65. Coöperating with the ring 75 is a brush contact 77 connected by a wire $n$ with a contact 79 preferably of resilient material and adapted to be flexed against its inherent resilience to engage a fixed contact 81 by a controlling device to be described. The fixed contact 81 is connected by a wire $n'$ with a contact 83 on the beam, said contact being adapted to engage with a needle contact 85 loosely supported in an arm 85ª projecting from a standard 85ᵇ. The needle contact is connected by a wire $n^2$ with a wire $n^3$ leading to the main negative wire N.

By the circuit just described if the contacts 83 and 85 engage and the contacts 79 and 81 engage, current will be supplied to the coils of the magnet 65, thereby energizing the latter and causing the same to grip the disk member 67 which is fast to the shaft 9. As a result the screw shaft will be turned in a direction to feed the poise outward. The contact rings 73 and 75 are uninterrupted and therefore current is continuously supplied to the clutch magnet 65 and a continuous feeding movement is imparted to the poise. The motor rotates at a high rate of speed and therefore the poise moves rapidly continuously outward until it passes the beam balance point. On the occurrence of this event the beam tilts downward. It is then desirable to reverse the poise and cause the same to feed back inward to the balance point. When the beam tilts down the contact 83 separates from the needle contact 85 and the circuit to the clutch magnet 65 is broken, thereby deënergizing the latter and causing the same to release its grip on the clutch disk 67. As a result the outward feed of the poise will be arrested.

To energize the oppositely rotating clutch magnet 63 and cause the poise to feed inward a circuit is provided comprising the branch wire $b^3$, referred to, connected to a brush contact 87 coöperating with a contact ring 89 encircling and connected to the clutch magnet coil 63. A similar ring 91 is connected to said coils and has coöperating therewith a brush contact 93 connected by a wire $n^4$ with a resilient contact 95 adapted to be moved into engagement with a fixed contact 97 by a controlling device to be described. The fixed contact 97 is connected by a wire $n^5$ with a needle contact 99 loosely supported on the beam. On down tilt of the beam said contact 99 is adapted to engage a fixed contact 100 on an arm 101 projecting from the standard 85ᵇ, referred to. The contact 101 is connected by a wire $n^6$ with the wire $n^3$, referred to, leading to the main negative wire N.

The up tilt of the beam is limited by a stop 102 and the down tilt of the beam is limited by a stop $102^a$.

If the beam is tilted down to connect the contacts 99 and 100 and the contacts 95 and 97 are connected the circuit will be complete to the clutch magnet 63, thereby energizing the latter and causing the same to grip the clutch disk 67 and transmit the rotation of the gear thereto. This will cause the poise to travel rapidly inward by a continuous movement.

The tilting up of the beam to the balance point is rather sluggish. Therefore, to prevent the poise from passing beyond the balance point its feed approaching said point should be by a slow step-by-step movement.

To change from a continuous to step-by-step movement the clutch magnets 63 and 65 instead of continuously gripping the disk 67 are caused intermittently to grip the same. To accomplish this the clutch magnet 65 is provided with a sectional contact ring 103 encircling the same and comprising alternating insulation and conductive portions. Coöperating with this ring is a brush contact 105 connected by a wire $n^7$ with the wire $n'$, referred to, leading to the beam contact 83. It will be observed that current can be taken off of the clutch magnet 65 either through the continuous ring 77 or the alternately conducting and insulation portion ring 103. If the circuit is complete to both of said rings the continuous ring will dominate and the magnet will continuously grip the disk 67. If, on the other hand, the circuit to the continuous ring is broken by the separation of the contacts 79 and 81, the circuit will be intermittently completed to the clutch magnet 65 through the sectional ring 103 and said magnet will intermittently grip the clutch disk 67.

The other clutch magnet 63 is provided with a sectional ring 107 of insulation and conductive portions coöperating with a brush contact 109 connected by a wire $n^8$ with the wire $n^5$ leading to the beam lower needle contact 99. Current may be taken off of the magnet 63 through both of the rings 91 and 107, but if the circuits for both of them are complete the ring 91 will dominate and current will be continuously supplied to the magnet clutch 63, thereby causing the same continuously to grip the clutch disk 67. If, however, the circuit from the ring 91 is broken by the separation of the contacts 95 and 97 current will be intermittently completed to the clutch magnet 63 through the sectional ring 107 and said magnet will intermittently grip the disk 67 and transmit a step feed to the poise screw shaft.

It is desired to feed the poise by a continuous movement excepting when it approaches the beam balance point. The controlling device for automatically changing from continuous to step-by-step feeding and vice versa will now be described. This device comprises disk members 111 and 113 (Figs. 1 and 7) the former being mounted on the hub of the latter and held thereto in different positions of adjustment by a screw 115. Projecting radially from the disk member 111 is a pin 117 and projecting radially from the disk member 113 is a pin 119. To frictionally rotate the disks 111 and 113 from the clutch shaft 9, the latter is provided with a disk 121 having a hub fast to said shaft and adapted to be pressed against friction material 123 interposed between said disk 121 and said disk member 113 by a helical spring 125 on said shaft confined between a washer 127 at the end of the hub of the disk member 113 and a ring 129 fast on said shaft.

By this construction the disk members 111 and 113 will be rotated frictionally from the clutch shaft 9 in one direction or the other in accordance with the direction of rotation of said clutch shaft until the pin 117 engages the resilient contact 81 in the negative continuous circuit for the clutch magnet 65, or until the pin 119 engages the resilient contact 95 in the negative continuous circuit for the clutch magnet 63. As soon as said pins have engaged and closed the contacts actuated thereby further rotative movement thereof will be arrested and the disk plate 121 will rotate relatively to said disk members without transmitting rotation thereto.

If for example the pin 117 is engaging the resilient contact 81 causing the same to connect with the contact 79 the continuous feeding circuit is completed for causing the poise to be fed rapidly continuously outward. As soon as the beam tilts downward this circuit is broken and the circuit is completed to the other clutch, thereby causing the poise to start to feed inward. The pin 119, however, will be at a considerable distance from the contact 95 and will have to travel through a considerable arc of travel before it will engage said contact and cause the same to engage with the contact 97. Since the contact 95 is separated from the contact 97 the continuous circuit to the clutch magnet 63 is broken, but the step-by-step circuit is completed. Therefore, the feed of the poise at this time will be by a step-by-step movement. In a normal weighing operation this step-by-step feed will continue until the poise reaches the beam balance point. On the occurrence of this event the beam will rise to an intermediate position in which the needle contacts 99 and 101 are separated and the needle contacts 83 and 85 are separated, thereby breaking both the inward and outward feed circuits for the poise. As a result the poise will be stationary.

As stated, the pin disk 111 may be adjusted relatively to the pin disk 113. By this arrangement the pins 117 and 119 may be adjusted into superposed relation or may be adjusted any desired distance apart and thereby permit the desired limit to be placed on the duration of the step-by-step feed since the spacing between the pins determines the length of this feed.

In weighing, it sometimes happens that the beam is vibrated more or less in an abnormal manner. As a result it is very important to provide some limit, such as described above for the step-by-step feed. Otherwise there would be a considerable loss of time from an unduly protracted step feed. The disk pin contact control arrangement described lends itself advantageously to this purpose. If for example the poise were caused to travel inward beyond the beam balance point very shortly thereafter the disk 113 would have rotated sufficiently to cause the pin 119 to engage the contact 95 and connect the same with the contact 97, thereby completing the continuous feed circuit to the clutch magnet 63. As a result the poise would travel rapidly during the remainder of its inward travel and would quickly reach a point where the beam would tilt upward, automatically reverse the poise and start the drive rapidly back outward to and beyond the beam balance point. Then the beam would tilt down again, causing the deënergization of one clutch and the energization of the other, thereby reversing the feed and producing a slow step travel of the poise to the balance point.

To steady the clutch shaft 9 and prevent any lost motion thereof, such for example as might be occasioned by the tendency of the resilient contact 79 to reversely rotate said shaft through the disk 111, said shaft is provided with a friction disk 130 pressed by a cup spring 130$^a$ toward the disks 111 and 113 and having an arm 130$^b$ projecting radially therefrom and anchored to a pin 130$^c$ in one of the standards supporting said shaft. By this construction the disk 130 is prevented from rotating, and being frictionally pressed against the other disks, acts through them and tends to prevent lost motion or overthrow of the shaft 9.

The feed steps may be with any frequency desired. To regulate this the relative length of the insulation and conductive segments of the magnet contact rings are varied as desired.

Having described the poise feeding motor, the clutches and their circuits for automatically causing the poise to travel with a continuous feed movement followed by a step-by-step feed movement to the balance point, there will now be described means for locking the beam after it has reached the balance point.

To this end the beam is provided with a lug 131 (Figs. 1 and 2) depending therefrom and having opposed notches for receiving teeth on arms 133 pivoted together adjacent their lower ends. These arms are drawn toward one another into the notches of said lug by the spring 135. To release said teeth from said notches there is provided an arm 137 pivoted on a fixed standard 139 and having rotative therewith a short arm 141 carrying rollers 143. When said arm is rocked in one direction the rollers 143 will spread the teeth apart and release the beam lug and when rocked in an opposite direction said teeth will be released to the action of the spring 135, permitting the latter to draw said teeth into the notches of said lug.

The arm 141 for the rollers 133 is oblique to the tooth arms 133 when holding them in open position. Therefore if said arm is released the spring 135 will automatically rock said roller arm 144 and cause the arms 133 to grip the beam lug.

The beam lock is automatically rendered effective to lock the beam after the poise has reached the balance point. To accomplish this the lock arm 137 is provided with an extension 145 adapted to be held by a latch 147 on an armature 149 adapted to be rocked in one direction by a spring 151 and in an opposite direction by a magnet 153. When this magnet is energized the latch 147 will be tripped from the extension 145 and permit the spring 135 to move the arms 133 and lock the beam.

The circuit for the magnet 153 comprises a wire $c$ tapped from the main positive wire P and connected to said magnet. This magnet is also connected by a wire $c'$ with a resilient contact 155 adapted to be connected by a timer device to be described with a resilient contact 157. This contact is connected by a wire $n^9$ with the wire $n^3$ leading to the main negative wire N.

The beam lock should not become effective to lock the beam until after a predetermined length of time, such for example as three seconds, has passed after the poise has reached the beam balance point in order to make certain that the beam is not locked until after it reaches its final position of balance.

When the contact 155 is connected with the contact 157 the circuit will be completed to the magnet 153, thereby energizing the latter, tripping the latch and permitting the beam lock to lock the beam.

The timer device for connecting the contacts 155 and 157 after the predetermined time interval has elapsed, will now be described. This device comprises a pair of disk members 159 and 161 (Figs. 1, 4, 5 and 8). The disk 161 has a long sleeve-like hub 163 loose on an end of the shaft 21 forming part of the gear train between the motor and the clutch. The disk 159 is held in different rotative positions of adjustment on the hub 163 by a screw 165. The disk 161 has a pin 167 projecting radially therefrom and adapted to engage the contact 155. The disk 159 has a pin 169 projecting radially therefrom and adapted to engage the contact 157. Encircling the hub 163 is a helical torsion spring 171 having one end fast to the disk 159 and the other end fast to a pin 173 projecting from an arm 175 to be referred to.

The disks 159 and 161 are rotated as a unit and in so doing energize the spring 171. A speed reduction transmission from the shaft 21 to said disks is provided comprising a planetary gear mechanism including a gear 177 receiving the shaft 21 and fast to one of the bearing standards 11, referred to. A second gear 179 is loosely mounted on the shaft 21 and is substantially of the same size as the gear 177 but is provided with one more tooth than the latter. Interposed between the gears 177 and 179 fast on the shaft 21 is an arm 181 having journaled adjacent an end thereof a short shaft 183 carrying pinions 185 and 187, the former meshing with the gear 177 and the latter meshing with the gear 179. By this arrangement a reduction from the high speed of the shaft 21 is made so that the disk 161 makes only about two revolutions per minute.

The rotation of the gear 179 is transmitted frictionally at times to the pin disk 161. To this end friction disks 189 are interposed between said gear and disk. To press the disks together the hub 163 is provided with a conical end 191 for engagement with a bearing seat 193 on the arm 175, referred to. This arm is pivotally mounted intermediate its ends and is provided with a spring 194 tending to rock said arm and press the disks together and thereby cause the disk 161 to be rotated by the gear 179. To prevent the disk 161 from being rotated by the gear 179 the arm 175 is provided with an armature 195 for coöperation with the magnet 69, referred to as being in the clutch circuits for controlling the travel of the poise.

The magnet 69 is energized so long as the beam is in its up or down tilted positions completing one or the other of the circuits to the clutches. Said magnet is deënergized, however, when the beam is in an intermediate or balanced position breaking the circuits to said clutches. Therefore, so long as the beam is in either its up or down tilted position the magnet will be energized and will rock the arm 175 against the resistance of the spring 194 and thereby release the pin disk 161 from the gear 179 and prevent rotation of said pin disk. The movement of the disk 161 away from the gear 179 is assisted by a spring 197 contained within the hub 163 and confined against an end of the shaft 21. When the beam reaches a position of balance the magnet is deënergized, thereby permitting the spring 194 to rock the arm 175 in a direction to press the disk 161 toward the gear 179. As a result rotation is transmitted from the gear 179 to the disk 161, causing the latter to slowly rotate until its pin 167 travels around and engages the contact 155, thereby moving the latter into engagement with the contact 157. This completes the circuit to the magnet 153, thereby energizing said magnet and tripping the latch 147 from the beam lock arm 145 and locking the beam. As stated, the shaft 21, on which the planetary gearing is mounted, is driven continuously from the motor and therefore it is rotated after the poise has been arrested at the balance point. The planetary speed reduction gearing, however, causes the disk 161 to rotate at a very slow rate of speed. Consequently, a period such for example as three seconds, may elapse while the pin 167 is moved through an arc of travel sufficient to bring it to the contact 155 to connect the same with the contact 157. This interval insures the preventing of the locking of the beam until the latter has reached a position of final balance. The interval of time from the arrival of the poise at the beam balance point to the locking of the beam may be varied by adjusting the disk 159 relatively to the disk 161 and locking the same to the hub of the latter by the screw 165.

On the initiation of the next weighing operation the beam will tilt upward and complete the circuit which energizes the magnet 69, thereby rocking the arm 175 and releasing the disk 161 from the gear 179. The spring 171, previously energized in the rotation of the disk as described, will then become effective to rotate the disk back to its original position where it will be in readiness to start and rotate around to measure off the three second or other interval between the next balance and locking of the beam.

The beam is unlocked on the initiation of the next weighing operation. To this end there is provided a lever 199 (Fig. 1) pivoted between its ends on the standard 139 referred to, and having one end for engagement with the arm 137 and its opposite end connected by a link 201 with a handle 203 pivoted on its lower end to a bracket 205 mounted on a plate beneath the beam. When this handle is rocked to the left (Fig. 1) it will rock the upper end of the roller 199 to the right, thereby causing the same to engage the arm 137 to rock the same in a contra-clockwise direction and spread the toothed arms 133 and release the beam.

The handle is urged in a clockwise direction by a spring 207 and is limited by a stop 209 so that after the handle has been rocked to the left to unlock the beam lock it will be automatically rocked to the right to engage said stop.

It is important that a weighing operation once initiated should be completed and a record printed of the weight before permitting the beam lock again to be released to initiate a second weighing operation. To automatically lock the handle 203 against movement to the left until after the weight has been printed there is provided an L-shaped latch 211 pivoted on a bracket 213 mounted on the plate beneath the beam. One end of this latch coöperates with a dog 215 pivoted to a face of the handle 203. Its rocking movement is limited by stops 217 and it is normally pressed toward one of them by a leaf spring 219. The other end of the latch 211 constitutes an armature coöperating with a magnet 221. When the magnet is energized the latch 211 is rocked in a contra-clockwise direction, thereby releasing the dog 215 and permitting the handle to be rocked to the left to unlock the beam. When the dog 215 was released by the latch 211 the spring 219 rocked the dog away from the right to the left pin 217. When the handle 203 is rocked back to the right by the spring 207 the latch 211 is no longer effective to lock the handle since after the latch was tripped the dog 215 moved out of line with the notch in the end of said latch.

The circuit for the magnet 221 comprises a wire $d$ tapped from the main positive wire P and connected by a wire $d'$ with a fixed contact 223 adjacent the printing mechanism to be described and adapted to be connected on the operation of said mechanism with a fixed contact 225. This fixed contact is connected by a wire $d^2$ with the magnet 221, the latter being connected by a wire $n^{10}$ with the main negative line N.

When the contacts 223 and 225 are connected in the course of producing a printed record of the weight the circuit is completed to the magnet 221, thereby energizing the latter and rocking the latch 211, causing the same to release the handle 203. The handle remains unlocked until the commencement of the next weighing operation. Then it is rocked to the left to unlock the beam on the initiation of this weighing operation and is automatically locked again until the completion of the weighing operation.

It may happen that substantially equal successive loads may be weighed. If a second load was of exactly the same weight as a first load obviously the beam would remain in a position of balance and a cycle of weighing operations would not be performed. It is therefore desirable to throw the beam out of balance on the initiation of each weighing operation. To accomplish this the poise is caused to travel inward a short distance on the initiation of each weighing operation. As shown herein this is effected through the instrumentality of the starting handle 203 which is employed to temporarily close a switch to complete a circuit to the clutch for feeding the poise inward. To this end a wire $f$ is tapped from the wire $n^5$ in the circuit to the clutch for feeding the poise inward, said wire being connected to a segmental contact 226 in a disk 226$^a$ of insulation material fast on the shaft of the handle 203. Coöperating with this disk is a resilient contact 226$^b$ connected by a wire $f'$ with the wire $n^6$ in the clutch circuit for feeding the poise inward. By this arrangement when the handle 203 is rocked to the left to unlock the beam lock the segmental contact 226 will come into engagement with the contact 226$^b$, thereby completing the circuit to the clutch for feeding the poise inward and causing the poise to be so fed. Since the handle 203 is merely momentarily rocked to the left and is promptly returned by its spring 207 to its position shown in Fig. 1, the $f$, $f'$ circuit is quickly broken by the disengagement of the contact 226 with the contact 226$^b$. As a result the poise is fed inward only a short distance. When the beam lock is released the beam tilts upward and completes the out clutch circuit, causing the poise to be fed outward.

As stated, the weight is recorded and automatically indicated. To this end the screw shaft is provided with an extension 227 (Figs. 1, 2 and 3) carrying a set of wheels 229 (Fig. 9) provided with type numerals. To take a record from these wheels there is provided above the same a series of platen hammers 231 mounted on resilient arms 233 secured to a shaft 234 journaled in a frame 235 supported on the beam. A ribbon of paper is fed from a let-off roll 237 around a guide roll 239 between said printing wheels and platens, and thence around another guide roll 241 to a take-up roll 243. An ink ribbon 245 is fed from a let-off roll 247 past a guide roll 249 between said platen hammers and print wheel and thence around a guide roll 251 to a take-up roll 253.

To actuate the platen hammers and make and print a record from the wheels on said paper ribbon there is provided a handle lever 255 pivoted between its ends on a lug 257. A finger 259 is pivotally connected to the handle lever 255 and projects upwardly toward the platen arms 233, where its end engages a single tooth in a wheel 261 fast to the shaft 234. Mounted on the frame 235 is a guide roller 263 engaging the finger 259.

By this construction when the handle 255 is rocked about its fulcrum in a contra-clockwise direction (Fig. 9) the finger 259 is thrust upwardly and rocks the shaft 234, thereby lifting the platen hammers away from the print wheels. Continued upward movement of the finger 259 causes an inclined portion 259a thereof to wipe past the guide roller 263 and throw the end of the finger out from the tooth in the wheel 261, thereby releasing the hammers which will fall by gravity and make an impress of the weight registration on the paper ribbon.

The rocking movement of the handle lever 255 is also utilized to feed fresh portions of the paper and ink ribbons to the printing wheels. To accomplish this a link 265 is connected at one end to the handle lever 255 and at its opposite end to a short arm 267 provided with a pawl 269 for engagement with a ratchet wheel 271 rotative with the paper ribbon take-up roll 243. By this construction each time the handle lever is rocked the link 265 will rock the short arm 267 and through the pawl 269 advance the ratchet wheel and paper ribbon take-up roll 243 a step.

This movement is utilized also to advance the ink ribbon take-up roll a step. To this end the link 265 is provided with a cam projection 273 for engagement with an arm 275 fulcrumed on the shaft of the ink ribbon take-up roll 253. Pivoted on this arm is a pawl 277 for engagement with a ratchet 279 rotative with said take-up roll. Each time the link 265 is moved upwardly the cam 273 will cause the arm 275 to rock in a contra-clockwise direction (Fig. 9) and through the pawl 277 will advance the ratchet 279 and take-up roll 253 an increment.

As stated, the operation of the handle in printing is utilized to complete the circuit to the magnet for tripping the latch beam lock release handle 203. To this end there is mounted on the handle lever 255 the contact 225 referred to, (Figs. 1 and 9) which is lifted up into engagement with the contact 223 each time the handle lever is rocked for printing.

The handle lever 255 is locked until after the poise reaches the balance point and the beam has been locked. To accomplish this there is provided a latch 293 (Fig. 9) normally held by a spring 295 in engagement with an end of the handle lever 255. The latch 293 has an armature 297 adapted to be attracted by a magnet 299. To energize this magnet a circuit is provided comprising (Fig. 1) a wire $e$ tapped from the wire $d$ leading from the main positive wire P, said wire $e$ being connected to a fixed contact 301 adjacent the latch for the beam lock. This fixed contact 301 is adapted to be connected to a fixed contact 303 by a bridge contact 305 carried by the lock latch 147. The fixed contact 303 is connected by a wire $e'$ with the magnet 299, the latter being connected by a wire $n^{12}$ with the main negative wire N.

When the magnet 153 is energized to trip the latch 147 and lock the beam the bridge contact 305 carried by said latch is rocked to connect the fixed contacts 301 and 303, thereby completing the circuit to the magnet 299, energizing said magnet and causing the same to trip the latch 293 from the handle lever 255. This will permit said lever to be rocked to effect a printing of the weight.

To register and permit the ready visualization of the weight there is provided an indicator 307 composed of a series of usual numeral wheels with provision for automatically transferring from a wheel of lower denomination to a wheel of higher denomination. As shown herein the indicator is mounted on the beam and is driven from the recorder by a gear 309 interposed between them.

The operation of the machine may be briefly described as follows:

First a load is placed on the platform of the scale. Then the switch 62 in the main positive line is closed to supply current to the various circuits of the machine. This immediately starts the motor to rotate but since neither the in nor the out feeding clutches are energized the motor is ineffective to feed the poise. Then the handle 203 is rocked to the left (Fig. 1), thereby completing the circuit to the in poise clutch, causing the poise to feed a short distance inward. This movement of the handle operates through the rod 201 and lever 199 to actuate the beam lock arm 137, thereby spreading the toothed arms 133 and unlocking the beam. The beam then tilts upward, completing the circuit to the out clutch, causing the poise to feed outward with a rapid continuous travel until it passes beyond the beam balance point. On the occurrence of this event the beam tilts downward, thereby completing the circuit to the in clutch, causing the poise to be fed step-by-step a short distance back to the beam balance point. On the arrival of the poise at this point the beam tilts upward to an intermediate position in which the circuits to both clutches are broken. The beam remains in this position for a short interval to make certain that it has arrived at a position of final balance. After the poise has been arrested the magnet 69 is deënergized and the spring 194 becomes effective to press the disk 161 toward the gear 179, causing said disk to rotate slowly around and eventually complete the circuit to the beam lock magnet, thereby locking the beam.

The rocking of the beam lock armature 139 in locking the beam moves the bridge contact 305 into position to complete the $e, e'$ circuit to the magnet 299 controlling the latch for the printing lever. This energizes said magnet, trips said latch and permits said lever to be operated to print a record of the weight. In the course of the rocking of said lever for this purpose the contacts 223 and 225 are connected, completing the $d, d', d^2$ circuit to the magnet at the handle 203. This energizes said magnet, trips the latch 211 and unlocks the handle. This marks the completion of a cycle of weighing operations and the handle is then free to be rocked to initiate the next cycle of weighing operations.

By my invention is provided an effective mechanism for accurately, automatically and rapidly completing a cycle of weighing operations. But a single motor is necessary for feeding the poise. The starting, stopping, reversing of the poise and the feeding of the same continuously and step-by-step is performed by a simple and effective clutch construction and arrangement of circuits.

Having described one illustrative embodiment of the invention without limiting the same thereto, what I claim as new and desire to secure by Letters Patent is:

1. A weighing machine comprising in combination, a beam; a poise thereon; a motor; members driven in opposite directions by said motor; means through which said motor drives said members; electro-magnets rotative with said members; transmission means extending from said electro-magnets to said poise and means for rendering one or another of said magnets effective to transmit the feed from said motor to said poise.

2. A weighing machine comprising in combination, a beam; a poise thereon; a motor; means including a shaft for transmitting movement to the poise; magnets loose on said shaft and driven in opposite directions by said motor; means through which said motor drives said magnets; means for causing one or the other of said magnets to rotate with said shaft to transmit the feed to said poise, and a source of electrical energy from which said motor is operated.

3. A weighing machine comprising in combination, a beam; a poise; a motor; members oppositely driven by said motor; means through which said motor drives said members; and means for transmitting motion from said members to said poise including electromagnets rotative with said members and circuits for said electro-magnets controlled by movement of the beam.

4. A weighing machine comprising in combination, a beam; a poise; a motor; members oppositely driven by said motor; means through which said motor drives said members; means to transmit motion from said members to said poise including electro-magnets rotative with said members, circuits for said electro-magnets and means for automatically breaking said circuits to arrest the poise on its arrival at the beam balance point.

5. A weighing machine comprising in combination, a beam; a poise; a motor; and means for transmitting motion from said motor to said poise including clutch means and means for operating said clutch means to impart a continuous or a step-by-step feed to the poise.

6. A weighing machine comprising in combination, a beam; a poise; and means for feeding said poise along said beam including clutch means and clutch controlling means for automatically effecting a continuous feeding movement of said poise along said beam in one direction and a step-by-step feed of said poise along said beam in an opposite direction.

7. A weighing machine comprising in combination, a beam; a poise; and means for feeding said poise along said beam including clutch means and clutch controlling means for automatically effecting a rapid, continuous feed of the poise followed by a step-by-step feed of the poise.

8. A weighing machine comprising in combination, a beam; a poise; and means for feeding said poise along said beam including clutch means and clutch controlling means for automatically effecting a continuous feed movement of said poise and a final short step-by-step feed of said poise.

9. A weighing machine comprising in combination, a beam; a poise; and means for feeding said poise along said beam including electro-magnetic clutch means, and means controlled by the beam for automatically continuously energizing the same to feed said poise by a continuous feed movement and for automatically and intermittently energizing the same to feed said poise with a step-by-step feed movement.

10. A weighing machine comprising in combination, a beam; a poise; and means controlled by said beam for feeding said poise along said beam including electro-magnetic clutch means, and circuits and controlling means coöperating therewith for automatically energizing the same continuously or intermittently to impart a continuous or step-by-step feed to the poise.

11. A weighing machine comprising in combination, a beam; a poise; and means controlled by said beam for feeding said poise along said beam including electro-magnetic clutches for feeding said poise respectively in opposite directions, and circuits and controlling means coöperating with said clutches to continuously or intermittently energize the same to impart a continuous or a step-by-step feed to the poise.

12. A weighing machine comprising in combination, a beam; a poise; and means for feeding said poise along said beam including oppositely rotative electro-magnetic clutches, circuits therefor controlled by movements of the beam for rendering one or another of said magnets effective to feed the poise, and means coöperating with said clutches for continuously or intermittently energizing the same to impart a continuous or a step-by-step feed to the poise.

13. A weighing machine comprising in combination, a beam; a poise; and means for feeding said poise along said beam including an electro-magnetic clutch having two continuous contact rings thereon and a sectional insulation and conductive ring thereon, brushes coöperating with said rings, and circuits therefor having provision for completing the circuit through said continuous rings or through one of said continuous rings and said sectional ring to continuously or intermittently energize the magnet and impart a continuous or step-by-step feed to the poise.

14. A weighing machine comprising in combination, a beam; a poise; and means for feeding said poise along said beam including clutch means and automatic controlling means for the latter for automatically rendering the same continuously or intermittently effective to impart a continuous or a step-by-step feed to said poise.

15. A weighing machine comprising in combination, a beam; a poise; and means for feeding said poise along said beam including clutch means and automatic controlling means for the latter for continuously or intermittently energizing the same to impart a continuous or a step-by-step feed to the poise, and means for automatically limiting the extent of the step-by-step feed.

16. A weighing machine comprising in combination, a beam; a poise; and means for feeding said poise along said beam including electro-magnetic clutch means and automatic controlling means for the latter for continuously or intermittently energizing the same to impart a continuous or a step-by-step feed to the poise, and means for automatically limiting the extent of the step-by-step feed.

17. A weighing machine comprising in combination, a beam; a poise; means for feeding said poise along said beam including electro-magnetic clutch means; means controlled by the beam for continuously or intermittently energizing the said clutch means automatically to impart a continuous and a step-by-step feed to the poise, and means for automatically limiting the extent of the step-by-step feed.

18. A weighing machine comprising in combination, a beam; a poise; and means for feeding said poise along said beam including a motor and electro-magnetic clutch means driven by said motor, electric circuits for said clutch means, switch means coöperating with said circuits for rendering the clutch effective continuously or intermittently to energize said clutch means to impart a continuous or a step-by-step feed to the poise, and controlling means actuated by said motor for automatically operating said switch means to arrest the step-by-step energization of said clutch means.

19. A weighing machine comprising in combination, a beam; a poise thereon; and means for feeding said poise along said beam including clutch means having provision for rendering the same continuously or intermittently effective for transmitting movements to the poise, and means for automatically shifting from the step-by-step movement to the continuous movement on the completion of a predetermined extent of step-by-step feed movement.

20. A weighing machine comprising in combination, a beam; a poise; a motor; transmission means from said motor to said poise including a shaft, an electro-magnetic clutch loose thereon, means for continuously or intermittently energizing said clutch means to connect the same with said shaft to impart a continuous or a step-by-step feed movement to the poise, and controlling means actuated by said motor for limiting the intermittent energization of said clutch means.

21. A weighing machine comprising in combination, a beam; a poise; a motor for feeding said poise along said beam; and transmission means from said motor to said poise including clutch means having provision for actuating the same to impart a continuous or a step-by-step feed movement to the poise, and means for variably limiting the extent of the step-by-step feed.

22. A weighing machine comprising in combination, a beam; a poise; and means for feeding said poise along said beam including a motor, means coöperating therewith for imparting a continuous or a step-by-step feed to said poise, and means coöperating therewith for variably limiting the extent of the step-by-step feed.

23. A weighing machine comprising in combination, a beam; a poise; electrical driving means for imparting a continuous and a step-by-step feed to said poise along the beam; a circuit for said driving means; a switch in said circuit; and means actuated by said driving means for automatically operating said switch to shift from a continuous to a step-by-step feed after the poise has been fed a continuous feed of predetermined extent.

24. A weighing machine comprising in combination, a beam; a poise; and driving means for feeding said poise along said beam including electro-magnetic clutch means having provision for imparting continuous and step-by-step feed movements to the poise, circuits for said clutch means, and controlling means for automatically shifting from a step-by-step to a continuous feed including a member actuated by said driving means for making and breaking said circuits.

25. A weighing machine comprising in combination, a beam having notches; a poise; means for feeding said poise along said beam; means for automatically arresting said poise on its arrival at the balance point; and means for locking said beam comprising opposed teeth for engagement with notches on said beam, a spring tending to cause said teeth to engage said notches, and cam means for separating said teeth to release the beam.

26. A weighing machine comprising in combination, a beam; a poise; means for feeding said poise along said beam having provision for automatically arresting said poise on its arrival at the beam balance point; and means for locking said beam including means having teeth to grip the beam, a rocking arm having means for engaging said teeth to cause the same to release the beam, latch means for holding said arm in position to open the teeth, and means for tripping said latch to permit said spring to lock said teeth to the beam.

27. A weighing machine comprising in combination, a beam; a poise; means for feeding said poise along said beam; means for automatically arresting said poise on its arrival at the beam balance point; and means for locking said beam including arms having teeth for gripping the beam, spring means tending to draw said arms toward one another, a rocking arm having cam means for releasing said teeth, latch means for holding said arm in releasing position, and a magnet for tripping said latch to permit said spring to cause said teeth to grip the beam.

28. A weighing machine comprising in combination, a beam; a poise; means to feed said poise along said beam; means for locking said beam after the poise reaches the balance point; and timer means actuated by said feeding means for rendering said locking means effective on the expiration of a predetermined time limit interval after the poise reaches the beam balance point.

29. A weighing machine comprising in combination, a beam; a poise; means including a motor for feeding said poise along said beam; a lock for the beam; and timer means driven by said motor and having provision for rendering said lock effective to lock the beam on the expiration of a predetermined time limit interval after the poise reaches the beam balance point.

30. A weighing machine comprising in combination, a beam; a poise; means including a motor for feeding said poise along said beam; a lock for the beam; electrical means for controlling said lock including a circuit having a switch therein and means driven by said motor for closing said switch to complete said circuit and release said lock after a predetermined time limit interval has elapsed after the poise reaches the beam balance point.

31. A weighing machine comprising in combination, a beam; a poise; means including a motor for feeding said poise along said beam; a lock for the beam; and means for controlling said lock including an electromagnet, a circuit therefor, a switch in said circuit, a wheel having an element projecting therefrom for closing said switch, and means for rotating said wheel from said motor a predetermined extent prior to the bringing of said element in position to close said switch to complete said circuit to said magnet and lock the lock.

32. A weighing machine comprising in combination, a beam; a poise; means including a motor for feeding said poise along said beam; a beam lock; and electrical means coöperating with said beam for controlling the same including a circuit, a switch in said circuit, a switch operating member rotated a predetermined extent by said motor before closing said switch, means through which said motor operates said member and means energized by such rotation for returning said member to an original position.

33. A weighing machine comprising in combination, a beam; a poise; means including a motor for feeding said poise along said beam; a lock for the beam; and means coöperating with said beam for controlling said lock including an electric circuit, a switch in said circuit, and means frictionally driven from said motor for closing said switch on the expiration of a predetermined time interval after the poise reaches the beam balance point.

34. A weighing machine comprising in combination, a beam; a poise; means including a motor for feeding said poise along said beam; a lock for said beam; and means coöperating with said beam for controlling said lock including an electric circuit, a switch in said circuit, and means driven by said motor for closing said switch on the expiration of a predetermined time limit interval and having provision for varying the interval.

35. A weighing machine comprising in combination, a beam; a poise; an indicator for registering movements of said poise; a recorder for printing the registration of said indicator; and means for driving said poise, indicator and recorder including a motor, electro-magnetic clutches and connections through which said clutches are driven by said motor, having provision controlled by movements of said beam for automatically changing the direction of movement of said poise, indicator and recorder.

36. A weighing machine comprising in combination, a beam; a poise; means for feeding said poise along said beam; a lock for the beam; means including a handle for opening said lock to release the beam; means for locking said handle during a weighing operation; means including a handle for making a record of the weight; and means for releasing said handle including a magnet, a circuit, and a switch in said circuit closed in the course of the operation of said recording handle.

37. A weighing machine comprising in combination, a beam; a poise; means for feeding said poise along said beam automatically to the beam balance point; a lock for the beam; means including a handle for unlocking said lock to release the beam; means including a recording handle for producing a record of the weight; means for locking said beam lock controlling handle during the weighing operation; and means for releasing said beam lock controlling handle including a magnet, an electric circuit, and a switch adapted to be closed on the movement of said recording handle.

38. In a weighing machine, the combination of a beam; a poise; and means controlled by the position of the beam for automatically feeding said poise continuously in one direction and step-by-step in an opposite direction, said means including an electric circuit.

39. In a weighing machine, the combination of a beam; a poise; a shaft connected to said poise; and means controlled by said beam for automatically rotating said shaft continuously in one direction and step-by-step in an opposite direction, said means including an electric circuit.

40. In a weighing machine, the combination of a beam; a poise; poise shifting means for transmitting either a continuous or a step-by-step feeding movement to said poise; and means controlled by said beam for automatically changing from said continuous movement to said step-by-step movement.

41. In a weighing machine, the combination of a beam; a poise; poise shifting means for automatically imparting an initial in-feeding movement to said poise, then a continuous out-feeding movement to said poise, and a step-by-step final inward feeding movement of said poise and means through which said poise shifting means is controlled by said beam.

42. In a weighing machine, the combination of a beam; a poise; and means controlled by said beam for transmitting a continuous feeding movement to said poise and having provision for automatically reducing the speed of said poise and imparting a step-by-step feed thereto as it approaches the balance point.

43. In a weighing machine, the combination of a beam; a poise; driving means for said poise including a clutch and having provision for imparting a continuous feeding movement to said poise automatically followed by a step-by-step feed at a lower speed, said driving means being controlled by said beam.

44. In a weighing machine, the combination of a beam; a poise; a motor; means through which said motor acts to impart a continuous feeding movement to said poise; and means automatically controlled by said beam for changing said continuous movement to a step-by-step movement.

45. In a weighing machine, the combination of a beam; a poise; driving means; means for transmitting the drive from the latter to said poise; and means including electric circuits controlled by said beam for automatically changing the feed from a continuous to a step-by-step movement.

46. In a weighing machine, the combination of a beam; a poise thereon; motor means for feeding said poise along said beam with a continuous feeding movement and having provision for automatically feeding said poise with a step-by-step movement; and means controlled by said beam for changing automatically said poise feed from said step-by-step movement to said continuous movement in case the step-by-step feed exceeds a predetermined extent.

47. In a weighing machine, the combination of a beam; a poise thereon; motor means for imparting continuous and step-by-step feed movements to said poise along the beam; and means for automatically shifting from said continuous to said step feed including an electrical circuit and contact means actuated by said beam; a beam lock; and motor means for rendering the same effective to lock the beam after the completion of a weighing operation.

48. In a weighing machine, the combination of a beam; a poise; motor means for feeding said poise along said beam by continuous and step-by-step movements; a beam lock; an actuating motor for the latter; and a timer for deferring the rendering of said actuating motor effective to cause said beam lock to lock the beam after the completion of a weighing operation.

49. In a weighing machine the combination of a beam; a poise; an indicator for registering movements of said poise; means including a motor for imparting continuous feeding movements to said poise and indicator; and means including electrical circuits controlled by movement of said beam for automatically reversing said poise and indicator.

50. In a weighing machine the combination of a beam; a poise; an indicator for registering movements of said poise; a recorder for producing a record corresponding to the indicator registration; a motor for imparting continuous feeding movements to said poise, indicator and recorder; and means coöperating with said motor for imparting step-by-step movements to said poise, indicator and recorder;

51. In a weighing machine, in combination, a beam, a poise thereon, means comprising motor driven electro-magnetic clutch elements adapted to cause movement of the poise relatively to the beam, means for varying the direction of said movement accordingly as the poise varies in position relatively to the balance point, and means adapted to vary the character of poise movement from continuous to step-by-step when the poise is moved into position near the balance point.

52. In a weighing machine, in combination, a beam, a poise thereon, means comprising motor driven electro-magnetic clutch elements adapted to cause movement of the poise relatively to the beam, means for varying the direction of said movement accordingly as the poise varies in position relatively to the balance point, means adapted to vary the character of poise movement from continuous to step-by-step, when the poise is moved into position near the balance point and a locking device adapted to secure said beam in a position of balance.

53. In a weighing machine, in combination, a beam, a poise thereon, means comprising motor driven electro-magnetic clutch elements adapted to cause movement of the poise relatively to the beam, means coöperating with the beam to vary the direction of said movement accordingly as the poise varies in position relatively to the balance point, a locking device adapted to secure said beam in a position of balance, and a timer adapted to insure a substantial interval between the striking of a position of balance by said beam and the locking thereof.

54. In a weighing machine, in combination, a beam, a poise thereon, a motor for moving the poise relatively to the beam, power transmission devices including electro-magnetically operated clutches for moving the poise in opposite directions relatively to said beam, electric circuits, and means coöperating with the beam for automatically and intermittently making and breaking one of said circuits to cause step-by-step movement of the poise.

55. In a weighing machine, in combination, a beam, a poise thereon, a motor for moving the poise relatively to the beam, power transmission devices including electro-magnetically operated clutches for moving the poise in opposite directions relatively to said beam, electric circuits for said clutches, means adapted to intermittently make and break one of said circuits to cause step-by-step movement of the poise, and means dependent upon the movement of said beam controlling the operation of said last means whereby the character of the poise movement is varied automatically from continuous to step-by-step.

56. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, and controlling means for said transmitting means and said character varying means automatically governed by movement of the poise relatively to the balance point.

57. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, controlling means for said transmitting means and said character varying means automatically governed by movement of the poise relatively to the balance point, and means adapted to lock the beam in a position of balance.

58. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, controlling means for said transmitting means and said character varying means automatically governed by movement of the poise relatively to the balance point, and means coöperatively associated with said poise adapted to indicate the weight in units.

59. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, controlling means for said transmitting means and said character varying means automatically governed by movement of the poise relatively to the balance point, and recording means coöperatively associated with said poise.

60. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, controlling means for said transmitting means and said character varying means automatically governed by movement of the poise relatively to the balance point, and means coöperating with said power transmitting means for initially unbalancing the beam.

61. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, controlling means for said transmitting means and said character varying means automatically governed by movement of the poise relatively to the balance point, means adapted to lock the beam in a position of balance, and means coöperating with said power transmitting means for initially unbalancing the beam.

62. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, controlling means for said transmitting means and said character varying means automatically governed by movement of the poise relatively to the balance point, means coöperatively associated with said poise adapted to indicate the weight in units, and recording means coöperatively associated with said poise.

63. In a weighing machine, in combination, a beam, a poise movable relatively to said beam, motor means, means between the motor and the poise for transmitting power from the motor to move the poise in opposite directions relatively to said beam, means for varying the character of poise movement from continuous to step-by-step, controlling means for said transmitting means and said character varying means automatically governed by movement of the poise relatively to the balance point, means coöperatively associated with said poise adapted to indicate the weight in units, recording means coöperatively associated with said poise, and means coöperating with said power transmitting means for initially unbalancing the beam.

64. A weighing machine comprising in combination a beam; a poise; means for feeding said poise along said beam including clutch devices and means controlled by said beam automatically to coöperate with the first said means to impart to said poise a continuous feed followed by a step-by-step feed, said last means including an electric circuit.

65. In a weighing machine, the combination of a beam; a poise; and means for feeding said poise continuously in one direction and step-by-step in an opposite direction.

66. In a weighing machine, the combination of a beam; a poise, a shaft therefor; and means for rotating said shaft continuously in one direction and step-by-step in an opposite direction.

67. In a weighing machine, the combination of a beam; a poise; a driving motor therefor having a torque tending to rotate the same continuously; and means coöperating with said motor to produce a step-by-step feed therefrom.

68. In a weighing machine, the combination of a beam; a poise; a driving motor therefor having provision for transmitting a continuous feeding movement to said poise; and means for changing from said continuous movement to a step-by-step movement.

69. In a weighing machine, the combination of a beam; a poise; and means for feeding said poise along said beam including a motor and connections for imparting an initial in-feeding movement of said poise and a continuous out-feeding movement of said poise, and a step-by-step final inward feeding movement of said poise.

70. In a weighing machine, the combination of a beam; a poise; and driving means therefor having provision for imparting a continuous feeding movement thereto followed by a step-by-step feed at a lower speed.

71. In a weighing machine, the combination of a beam; a poise; a motor for imparting a continuous feeding movement to said poise; and means controlled by said beam for changing said continuous movement to a step-by-step movement.

72. In a weighing machine, the combination of a beam; a poise, driving means; means for transmitting the drive from the latter to said poise; and means including electric circuits controlled by said beam for changing the feed from a continuous to a step-by-step movement.

73. In a weighing machine, the combination of a beam; a poise; motor means for feeding said poise along said beam with a continuous feeding movement and step-by-step movement; and means for controlling said motor means automatically causing the same to feed said poise initially inward and outward with a continuous movement and back inward with a step-by-step movement.

74. In a weighing machine, the combination of a beam; a poise thereon; motor means to feed said poise along said beam with a step-by-step movement; and means for preventing a step feed of said poise in excess of a predetermined length of travel.

75. In a weighing machine, the combination of a beam; a poise thereon; motor means for feeding said poise along said beam with a continuous feeding movement and having provision for feeding said poise with a step-by-step movement; and means for changing from said step-by-step movement to said continuous movement in case the step-by-step feed exceeds a predetermined extent.

76. In a weighing machine, the combination of a beam; a poise; an indicator for registering movements of said poise; and motor means for giving said poise and indicator continuous feeding movements followed by step-by-step feeding movements.

77. In a weighing machine, the combination of a beam; a poise; an indicator for registering movements of said poise; a recorder for producing a record corresponding to the indicator registration; a motor for imparting continuous feeding movements to said poise, indicator and recorder; and means coöperating with said motor for imparting step-by-step movements to said poise, indicator and recorder.

78. In a weighing machine; the combination of a beam; a poise thereon, motor means for feeding said poise with continuous and step-by-step movements; and means for initiating a weighing operation including a handle and beam controlled circuits for preventing step-by-step feeding movements on the initiation of a weighing operation.

79. In a weighing machine the combination of a beam; a poise; a motor for imparting a continuous feeding movement to said poise; transmission means from said motor to said poise including a clutch; means for operating said clutch to connect said motor with said poise on the initiation of a weighing operation; and means for automatically locking said beam after the arrival of said poise at the beam balance point.

80. In a weighing machine the combination of a beam; a poise; a motor for imparting a continuous feeding movement to said poise; means for transmitting movement from said motor to said poise; a beam lock and means for automatically rendering the same effective to lock said beam on the elapse of a predetermined time limit after the poise reaches the balance point.

In testimony whereof I have signed my name to this specification in the presence of two subscribing witnesses.

THEODORE M. FOOTE.

Witnesses:
HENRY T. WILLIAMS,
ROBERT H. KAMMLER.